US012645001B2

(12) United States Patent
Morita et al.

(10) Patent No.:  US 12,645,001 B2
(45) Date of Patent:  Jun. 2, 2026

(54) RADIATION IMAGING SYSTEM

(71) Applicant: CANON KABUSHIKI KAISHA, Tokyo (JP)

(72) Inventors: Hideaki Morita, Tokyo (JP); Yoshiaki Serizawa, Kanagawa (JP); Hiroto Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 18/436,120

(22) Filed: Feb. 8, 2024

(65) Prior Publication Data

US 2024/0280715 A1     Aug. 22, 2024

(30) Foreign Application Priority Data

Feb. 17, 2023    (JP) ................................. 2023-023638

(51) Int. Cl.
| | |
|---|---|
| *G01T 1/17* | (2006.01) |
| *G01T 1/24* | (2006.01) |
| *G01T 1/29* | (2006.01) |

(52) U.S. Cl.
CPC .............. *G01T 1/2928* (2013.01); *G01T 1/17* (2013.01); *G01T 1/247* (2013.01)

(58) Field of Classification Search
CPC .......... G01T 1/2928; G01T 1/17; G01T 1/247
See application file for complete search history.

(56) References Cited

U.S. PATENT DOCUMENTS

| | | | |
|---|---|---|---|
| 10,371,838 B2 | 8/2019 | Morita | |
| 10,939,890 B2 | 3/2021 | Kuwata | |
| 11,627,930 B2 * | 4/2023 | Kuwata | ................ A61B 6/4494 |
| | | | 378/62 |

(Continued)

FOREIGN PATENT DOCUMENTS

| | | | | | |
|---|---|---|---|---|---|
| JP | 2013138829 A | * | 7/2013 | ............. | A61B 6/542 |
| JP | 2013172788 A | * | 9/2013 | ............. | H04N 25/30 |

(Continued)

OTHER PUBLICATIONS

Extended European Search Report issued by the European Patent Office on Jul. 26, 2024 in corresponding EP Patent Application No. 24157521.6.

(Continued)

*Primary Examiner* — Uzma Alam
*Assistant Examiner* — Fani Polyzos Boosalis
(74) *Attorney, Agent, or Firm* — Carter, DeLuca & Farrell LLP

(57)     ABSTRACT

A radiation imaging system includes an irradiation system including a generator configured to emit radiation and a controller configured to control irradiation with the radiation, a radiation imaging apparatus configured to detect the radiation and request the irradiation system to stop the irradiation with the radiation based on an irradiation dose of the radiation, and a calculation unit configured to calculate a delay time caused at a stop of irradiation with the radiation based on first time information specified by the radiation imaging apparatus with respect to the stop of the irradiation with the radiation and second time specified by the irradiation system with respect to the stop of the irradiation with the radiation.

10 Claims, 8 Drawing Sheets

(56) References Cited

U.S. PATENT DOCUMENTS

2015/0055752 A1    2/2015  Takahashi
2020/0166659 A1    5/2020  Fujiyoshi

FOREIGN PATENT DOCUMENTS

JP       2017-202034 A    11/2017
JP       2018183279 A    11/2018

OTHER PUBLICATIONS

Indian Office Action issued in corresponding IN Patent Application
No. 202444010017, dated Nov. 28, 2025, with English translation.

* cited by examiner

F I G. 1
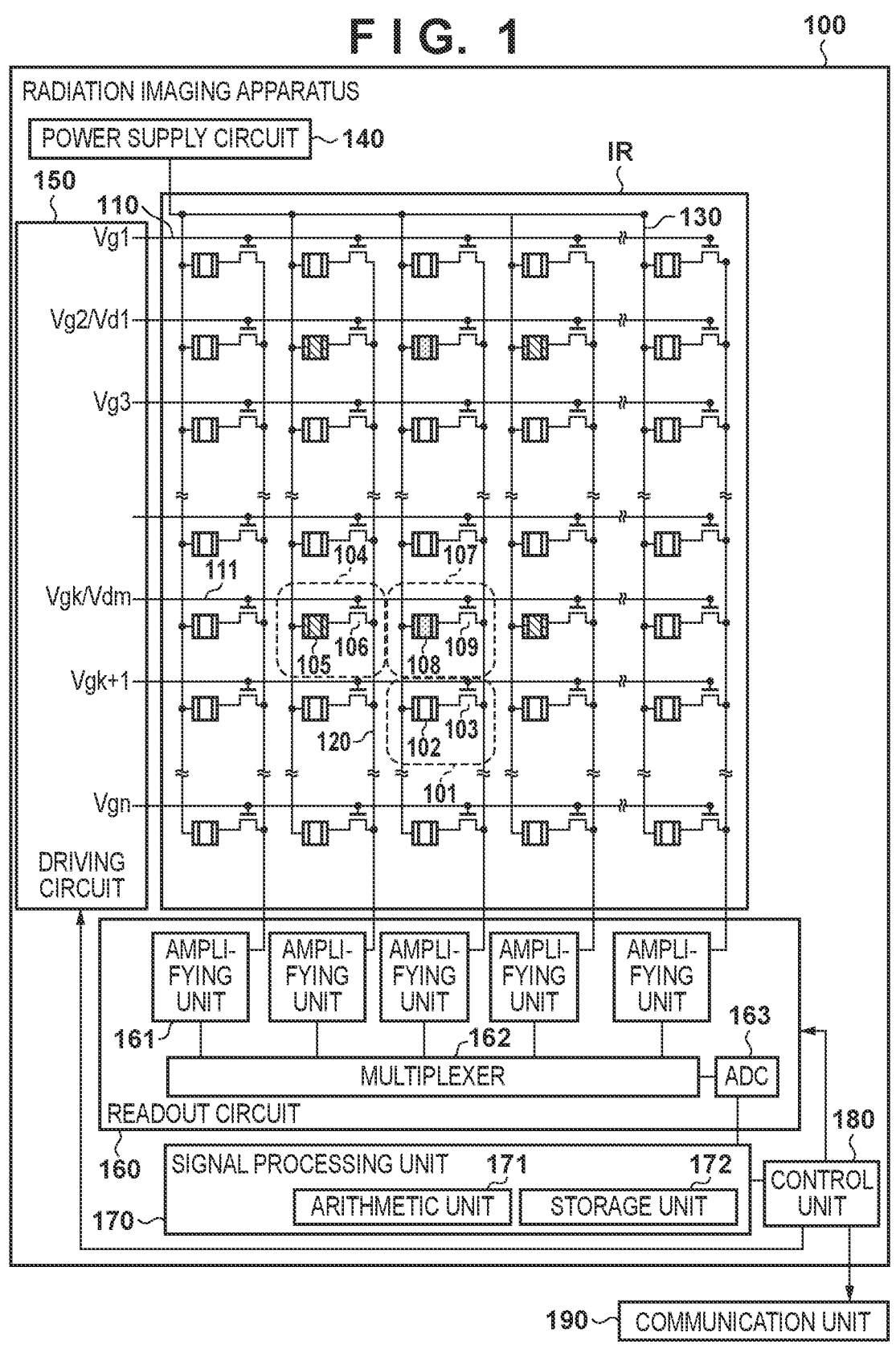

F I G. 2
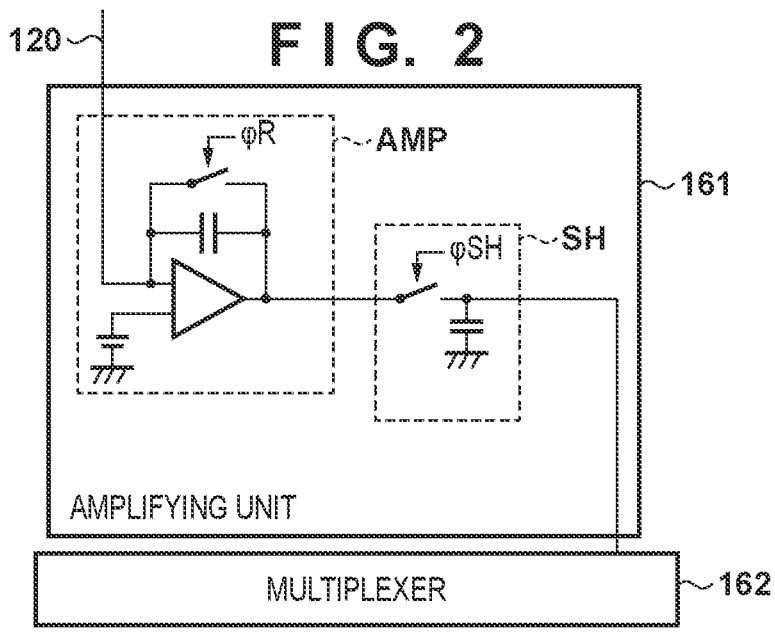
F I G. 3
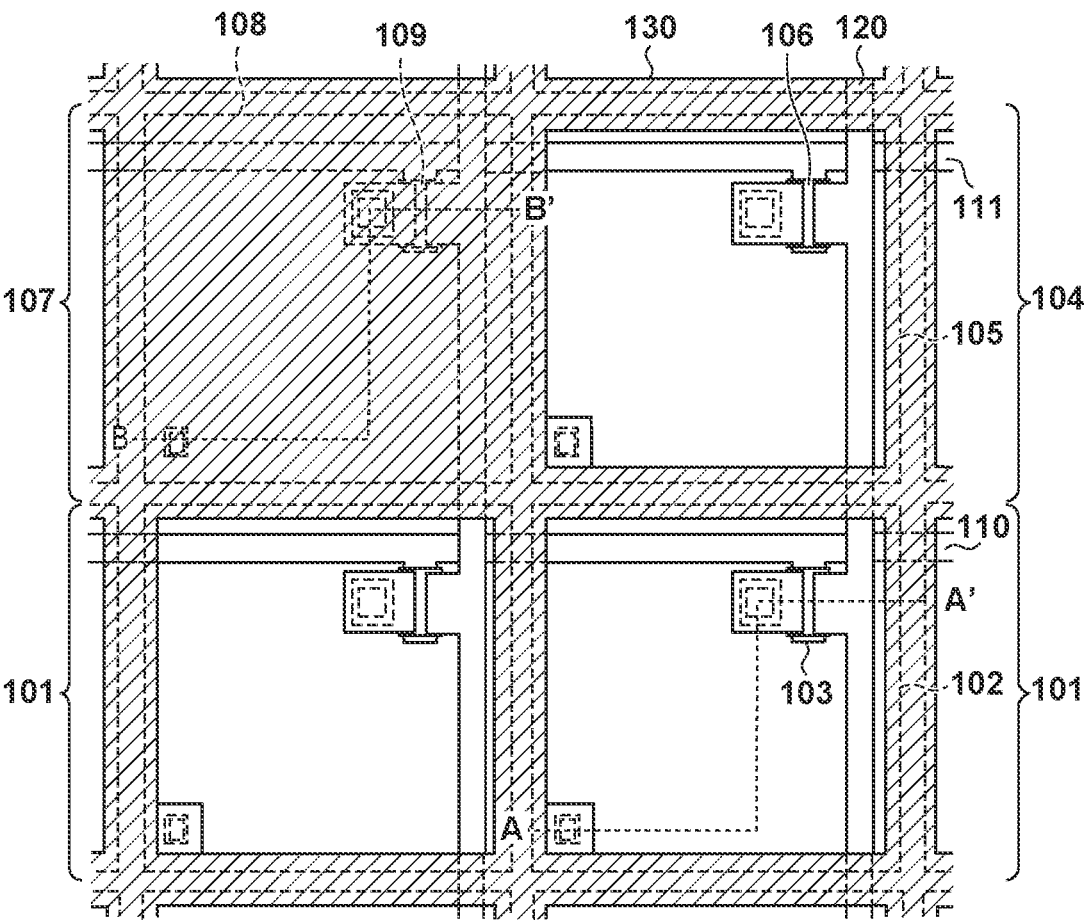

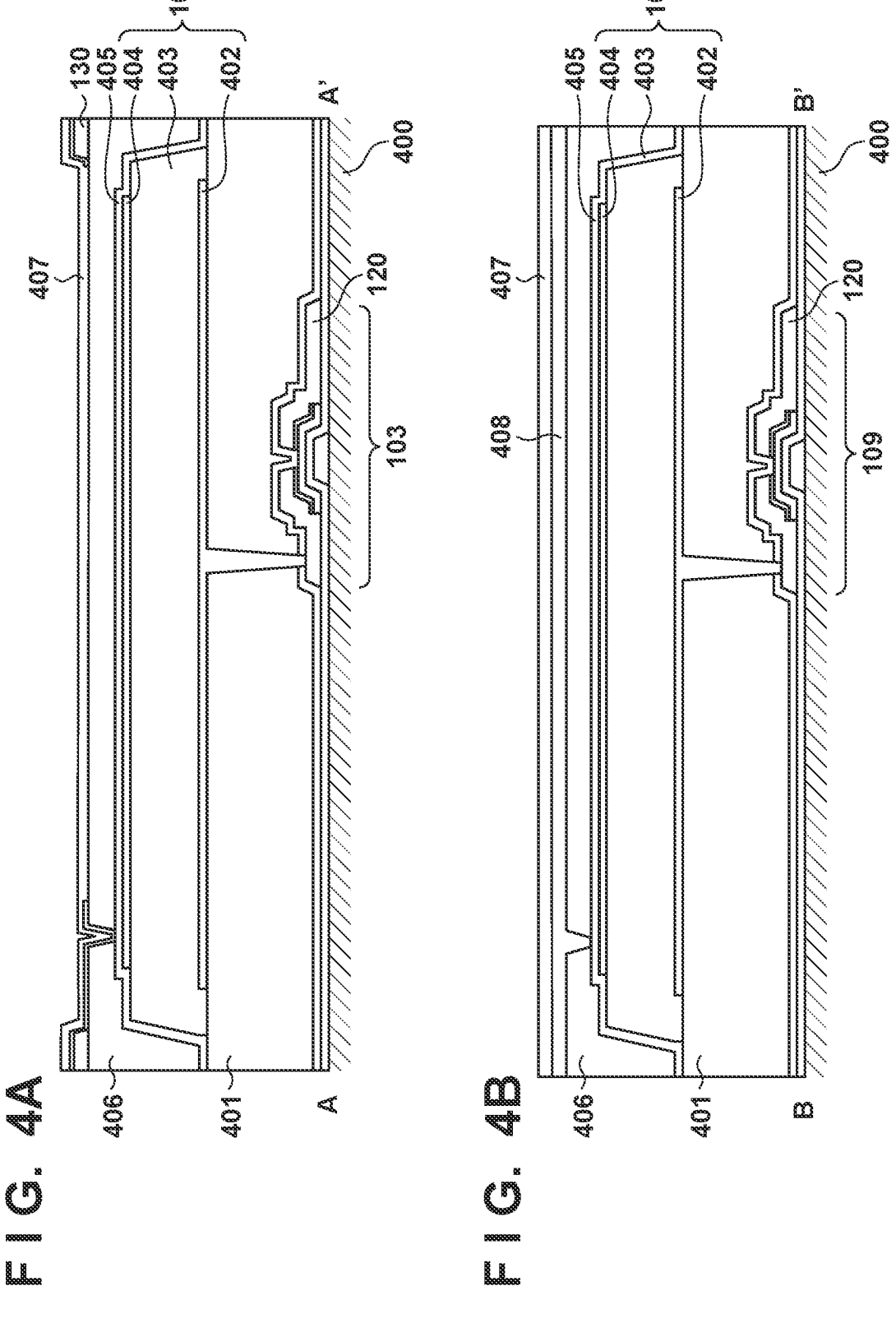
F I G. 4A
F I G. 4B

F I G. 5
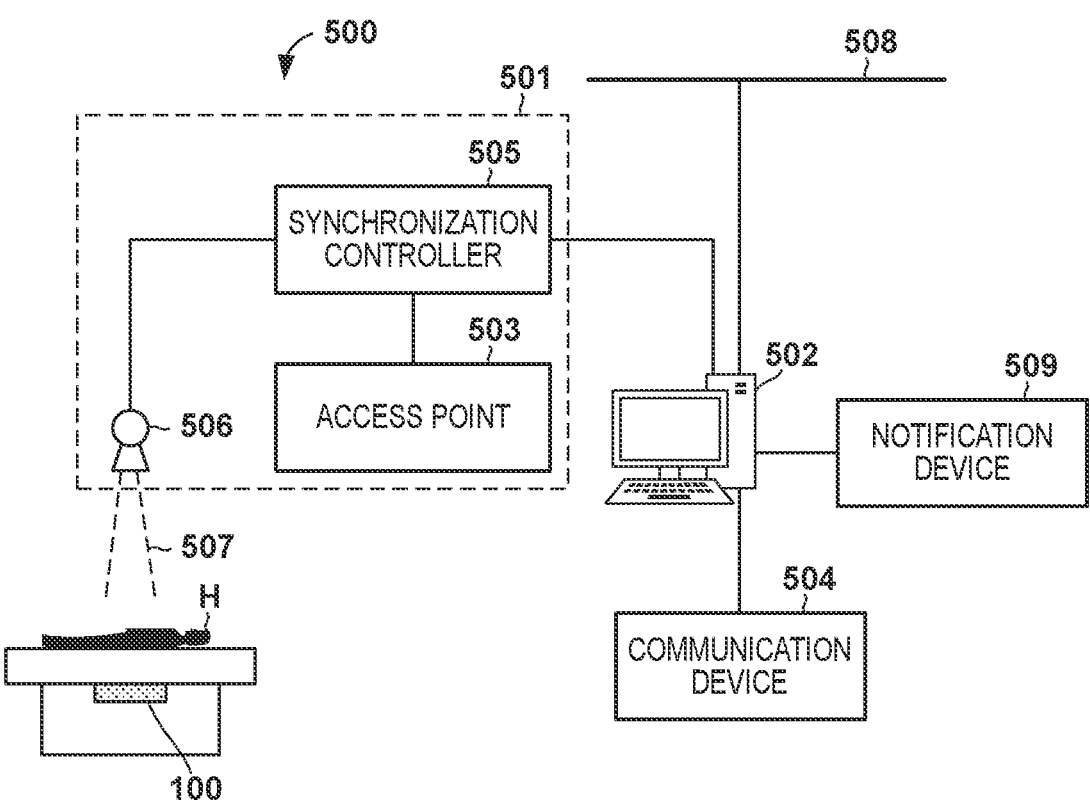

F I G. 10
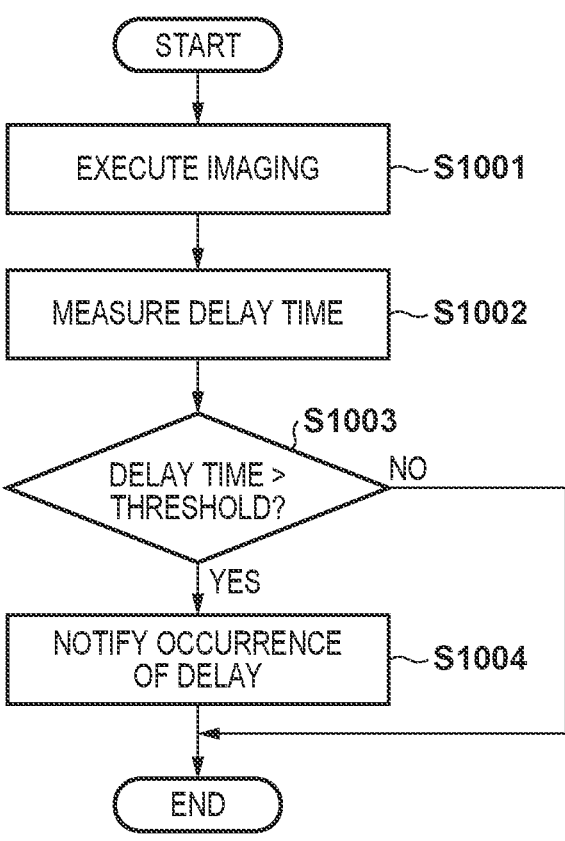

RADIATION IMAGING SYSTEM

BACKGROUND OF THE INVENTION

Field of the Invention

The present invention relates to a radiation imaging system.

Description of the Related Art

A radiation imaging apparatus having an automatic exposure control (AEC) function is known. Such a radiation imaging apparatus measures a radiation dose during irradiation and can stop the irradiation with radiation in accordance with the measurement result. The radiation imaging apparatus described in Japanese Patent Laid-Open No. 2013-138829 transmits a signal for requesting the stop of irradiation with radiation to a radiation generator. The radiation generator stops the irradiation with radiation in accordance with this signal. After the radiation imaging apparatus requests the radiation generator to stop the irradiation with radiation, the radiation generator sometimes does not immediately stop the irradiation with radiation due to a communication delay or another kind of delay. In a conventional radiation imaging system, it is difficult for the user to recognize such a delay, and hence the user may repeat imaging in the same environment.

SUMMARY OF THE INVENTION

An aspect of the present disclosure provides a technique for measuring the delay time caused in stopping irradiation with radiation.

According to some embodiments, a radiation imaging system, comprising: an irradiation system including a generator configured to emit radiation and a controller configured to control irradiation with the radiation; a radiation imaging apparatus configured to detect the radiation and request the irradiation system to stop the irradiation with the radiation based on an irradiation dose of the radiation; and a calculation unit configured to calculate a delay time caused at a stop of irradiation with the radiation based on first time information specified by the radiation imaging apparatus with respect to the stop of the irradiation with the radiation and second time information specified by the irradiation system with respect to the stop of the irradiation with the radiation is provided.

Further features of the present invention will become apparent from the following description of exemplary embodiments with reference to the attached drawings.

BRIEF DESCRIPTION OF THE DRAWINGS

FIG. 1 is a block diagram for explaining an example of the arrangement of a radiation imaging apparatus according to some embodiments;

FIG. 2 is a schematic view for explaining an example of the arrangement of an amplifying unit according to some embodiments;

FIG. 3 is a plan view for explaining an example of the arrangement of each pixel according to some embodiments;

FIGS. 4A and 4B are sectional views for explaining an example of the arrangement of each pixel according to some embodiments;

FIG. 5 is a view for explaining an example of the arrangement of a radiation imaging system including a radiation imaging apparatus according to some embodiments;

FIG. 10 is a flowchart for explaining an operation example for notifying a user of a delay according to some embodiments.

DESCRIPTION OF THE EMBODIMENTS

Figure 6:
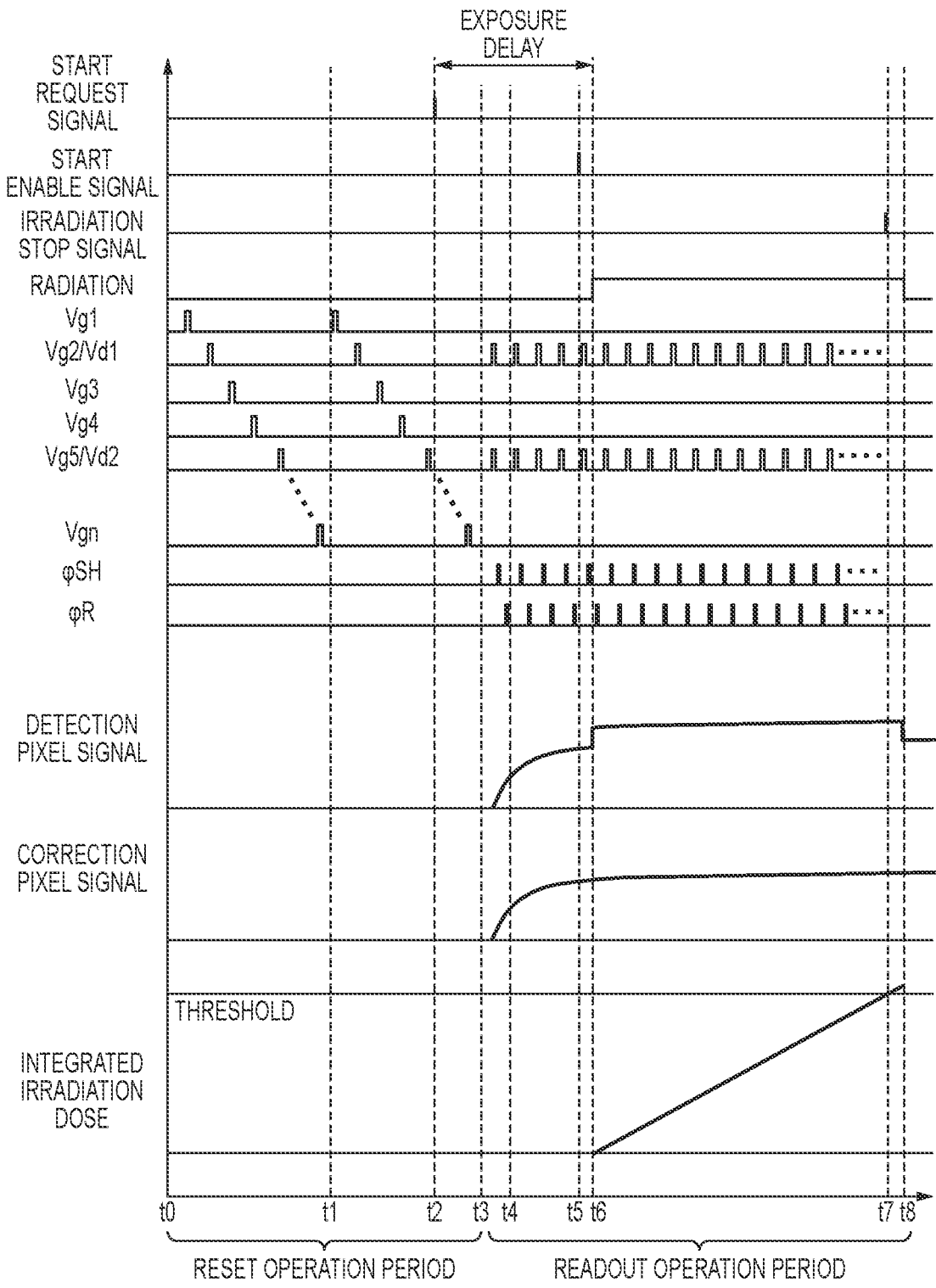
FIG. 6 is a timing chart for explaining an example of the operation of the radiation imaging apparatus according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 shows an example of the arrangement of a radiation imaging apparatus 100 according to the first embodiment of the present invention. The radiation imaging apparatus 100 includes a plurality of pixels arrayed in an imaging region IR so as to form a plurality of rows and a plurality of columns, a plurality of drive lines 110, and a plurality of signal lines 120. The plurality of drive lines 110 are arranged in correspondence with the plurality of pixel rows. Each of the drive lines 110 corresponds to a corresponding one of the pixel rows. The plurality of signal lines 120 are arranged in correspondence with the plurality of pixel columns. Each of the signal lines 120 corresponds to a corresponding one of the pixel columns. The imaging region IR constituted by the plurality of pixels functions as a sensor unit that detects radiation 507 emitted by a radiation generator 506 (to be described later).

The plurality of pixels include a plurality of imaging pixels 101 used for acquiring a radiation image, one or more detection pixels 104 used for monitoring the irradiation dose of radiation, and one or more correction pixels 107 used for correcting the irradiation dose of radiation. The sensitivity of the correction pixel 107 to radiation is lower than that of the detection pixel 104 to radiation.

Each imaging pixel 101 includes a conversion element 102 that converts radiation into an electrical signal and a switch element 103 that connects the corresponding signal line 120 to the conversion element 102. Each detection pixel 104 includes a conversion element 105 that converts radiation into an electrical signal and a switch element 106 that connects the corresponding signal line 120 to the conversion element 105. The detection pixels 104 are arranged so as to be included in the rows and the columns that are formed by the plurality of imaging pixels 101. Each correction pixel 107 includes a conversion element 108 that converts radiation into an electrical signal and a switch element 109 that connects the signal line 120 to the conversion element 108. The correction pixels 107 are arranged so as to be included in the rows and the columns formed by the plurality of imaging pixels 101. Referring to FIG. 1 and the subsequent drawings, different hatchings are respectively added to the conversion element 102, the conversion element 105, and the conversion element 108 to discriminate the imaging pixel 101, the detection pixel 104, and the correction pixel 107.

The conversion element 102, the conversion element 105, and the conversion element 108 each may be constituted by a scintillator that converts radiation into light and a photoelectric conversion element that converts light into an electric signal. The scintillator is generally formed in the form of a sheet covering the imaging region IR and shared by a plurality of pixels. In place of this configuration, the conversion element 102, the conversion element 105, and the conversion element 108 each may be formed from a conversion element that directly converts radiation into an electrical signal.

The switch element 103, the switch element 106, and the switch element 109 each may include a thin-film transistor (TFT) having an active region formed from a semiconductor such as amorphous silicon or polysilicon.

The first electrode of the conversion element 102 is connected to the first main electrode of the switch element 103. The second electrode of the conversion element 102 is connected to a bias line 130. One bias line 130 extends in the column direction and is commonly connected to the second electrodes of the plurality of conversion elements 102 arrayed in the column direction. The bias line 130 receives a bias voltage Vs from a power supply circuit 140. The second main electrodes of the switch elements 103 of one or more imaging pixels 101 included in one column are connected to one signal line 120. The control electrodes of the switch elements 103 of one or more imaging pixels 101 included in one row are connected to one drive line 110.

The detection pixel 104 and the correction pixel 107 each also have a pixel arrangement similar to that of the imaging pixel 101 and is connected to the corresponding drive line 110 and the corresponding signal line 120. The detection pixel 104 and the correction pixel 107 are exclusively connected to the signal line 120. That is, the correction pixel 107 is not connected to the signal line 120 to which the detection pixel 104 is connected. In addition, the detection pixel 104 is not connected to the signal line 120 to which the correction pixel 107 is connected. The imaging pixel 101 may be connected to the same signal line 120 as that to which the detection pixel 104 or the correction pixel 107 is connected.

A driving circuit 150 is configured to supply a drive signal to each drive target pixel via the plurality of drive lines 110 in accordance with a control signal from a control unit 180. In this embodiment, a drive signal is a signal for turning on the switch element included in a drive target pixel. The switch element of each pixel is turned on by a high-level signal and turned off by a low-level signal. Accordingly, this high-level signal is called a drive signal. Supplying a drive signal to a given pixel will set a state in which a readout circuit 160 can read out the signal accumulated in the conversion element of the pixel. The drive line 110 that is connected to at least one of the detection pixel 104 and the correction pixel 107 is called a detection drive line 111.

The readout circuit 160 is configured to read out signals from a plurality of pixels via the plurality of signal lines 120. The readout circuit 160 includes a plurality of amplifying units 161, a multiplexer 162, and an analog/digital converter (to be referred to as an AD converter hereinafter) 163. Each of the plurality of signal lines 120 is connected to a corresponding one of the plurality of amplifying units 161 of the readout circuit 160. One signal line 120 corresponds to one amplifying unit 161. The multiplexer 162 selects the plurality of amplifying units 161 in a predetermined order and supplies signals from the selected amplifying units 161 to the AD converter 163. The AD converter 163 converts the supplied signal into digital signals and outputs them.

The signal read out from the imaging pixel 101 is supplied to a signal processing unit 170. The signal processing unit 170 performs processing such as an arithmetic operation and a storing operation. More specifically, the signal processing unit 170 includes an arithmetic unit 171 and a storage unit 172, generates a radiation image based on the signals read out from the imaging pixels 101 by the arithmetic unit 171, and supplies the radiation image to the control unit 180. The signals read out from the detection pixel 104 and the correction pixel 107 are supplied to the signal processing unit 170. The arithmetic unit 171 of the signal processing unit 170 then performs processing such as an arithmetic operation and a storing operation for the supplied signals. More specifically, the signal processing unit 170 outputs information indicating irradiation of the radiation imaging apparatus 100 with radiation based on the signals read out from the detection pixel 104 and the correction pixel 107. For example, the signal processing unit 170 detects irradiation of the radiation imaging apparatus 100 with radiation and determines an irradiation dose of radiation and/or an integrated irradiation dose.

The control unit 180 controls the driving circuit 150 and the readout circuit 160 based on information from the signal processing unit 170. The control unit 180 controls, for example, the start and end of exposure (the accumulation of electric charge corresponding to radiation emitted by the imaging pixel 101) based on information from the signal processing unit 170. The control unit 180 may be implemented by a general-purpose processing circuit such as a microprocessor or a dedicated processing circuit such as an Application Specific Integrated Circuit (ASIC). When the control unit 180 is formed from a general-purpose processing circuit, the control unit 180 may further include a memory.

In order to determine an irradiation dose of radiation, the control unit 180 controls the driving circuit 150 to set a state in which only signals from the detection pixel 104 and the correction pixel 107 can be read out by scanning only the detection drive line 111. The control unit 180 then controls the readout circuit 160 to read out signals from columns corresponding to the detection pixel 104 and the correction pixel 107 and outputs the signals as information indicating the irradiation dose of radiation. With this operation, the radiation imaging apparatus 100 can obtain irradiation information at the detection pixel 104 during irradiation with radiation.

A communication unit 190 is controlled by the control unit 180 and has a function of performing communication between the radiation imaging apparatus 100 and an external device. Communication may be wired communication or wireless communication. Communication may comply with any kind of standard. In order to cope with a plurality of kinds of standards, the radiation imaging apparatus 100 may include a plurality of communication units 190.

FIG. 2 shows an example of the detailed circuit arrangement of the amplifying unit 161. The amplifying unit 161 includes a differential amplifying circuit AMP and a sample/hold circuit SH. The differential amplifying circuit AMP amplifies and outputs a signal appearing on the signal line 120. The control unit 180 can reset the potential of the signal line 120 by supplying a control signal φR to the switch element of the differential amplifying circuit AMP. The sample/hold circuit SH can hold an output from the differential amplifying circuit AMP. The control unit 180 causes the sample/hold circuit SH to hold a signal by supplying a control signal øSH to the switch element of the sample/hold circuit SH. The signal held by the sample/hold circuit SH is read out by the multiplexer 162.

An example of the structure of the pixels of the radiation imaging apparatus 100 will be described with reference to FIGS. 3 to 4B. FIG. 3 is a plan view showing the arrangements of the imaging pixel 101, the detection pixel 104, and the correction pixel 107 of the radiation imaging apparatus 100. The plan view is equivalent to an orthographic projection on a plane parallel to the imaging region IR of the radiation imaging apparatus 100. As indicated by the hatchings, a metal layer is arranged on the conversion element 108 of the correction pixel 107. This metal layer shields the conversion element 108 against light.

FIG. 4A is a sectional view of the imaging pixel 101 along line A-A' in FIG. 3. A sectional view of the detection pixel 104 is similar to that of the imaging pixel 101. The switch element 103 is arranged on an insulating support substrate 400 such as a glass substrate. The switch element 103 may be a TFT (Thin-Film Transistor). An interlayer dielectric layer 401 is arranged on the switch element 103. The conversion element 102 is arranged on the interlayer dielectric layer 401. The conversion element 102 is a photoelectric conversion element that can convert light into an electrical signal. The conversion element 102 is constituted by, for example, an electrode 402, a PIN photodiode 403, and an electrode 404. The conversion element 102 may be formed from an MIS sensor instead of a PIN photodiode.

A protective film 405, an interlayer dielectric layer 406, the bias line 130, and a protective film 407 are arranged on the conversion element 102 in this order. A planarization film and a scintillator (neither shown here) are arranged on the protective film 407. The electrode 404 is connected to the bias line 130 via a contact hole. ITO having light transparency is used as a material for the electrode 404. This allows the electrode 404 to transmit the light converted from radiation by the scintillator (not shown).

FIG. 4B is a sectional view of the correction pixel 107 along line B-B' in FIG. 3. The correction pixel 107 may be different from the imaging pixel 101 and the detection pixel 104 in that the conversion element 108 is covered by a light-shielding member 408 and be the same in other respects. The light-shielding member 408 is formed from, for example, the same metal layer as that of the bias line 130. Since the conversion element 108 of the correction pixel 107 is covered by the light-shielding member 408, the sensitivity of the correction pixel 107 to radiation is considerably lower than the sensitivity of the imaging pixel 101 and the detection pixel 104. The electric charge accumulated in the conversion element 108 of the correction pixel 107 may not be originated from radiation.

FIG. 5 shows an example of the arrangement of a radiation imaging system 500 including the radiation imaging apparatus 100. The radiation imaging system 500 includes the radiation imaging apparatus 100, an information processing apparatus 502, an access point 503, a communication device 504, a synchronization controller 505, and the radiation generator 506.

The radiation imaging apparatus 100 generates a radiation image based on the radiation 507 transmitted through an object H. For example, the radiation imaging apparatus 100 converts incident radiation into electric charge and generates image data by processing the electric charge. The radiation imaging apparatus 100 transmits the generated image data to the information processing apparatus 502.

The information processing apparatus 502 is a controller such as a general-purpose computer that may be implemented by existing technology. The information processing apparatus 502 includes a display unit, an input unit, and a control unit. The information processing apparatus 502 corrects the image data received from the radiation imaging apparatus 100 and performs image processing for saving and displaying the image data. The information processing apparatus 502 may cause the radiation imaging apparatus 100 to perform part or all of image processing.

The information processing apparatus 502 may display a radiation image to the operator and instruct the start of imaging via the display unit. In addition, the information processing apparatus 502 may acquire, for example, an instruction for an imaging condition from the operator by using an input unit. The control unit of the information processing apparatus 502 may have a function of comparing an acquired signal intensity with a threshold, replying to a connection request, or transmitting information (for example, wireless information (to be described later)) for communication with a wireless communication unit.

The access point 503 is a device that relays electric waves for wirelessly exchanging information between the radiation imaging apparatus 100 and the information processing apparatus 502. The control unit 180 of the radiation imaging apparatus 100 wirelessly communicates with the access point 503 by controlling the communication unit 190. Referring to FIG. 5, although the access point 503 is connected to the information processing apparatus 502 via the synchronization controller 505, the access point 503 may be directly connected to the information processing apparatus 502.

The communication device 504 is a device that transmits/receives electric waves for short-distance wireless communication between the radiation imaging apparatus 100 and the information processing apparatus 502. The communication device 504 is connected to the information processing apparatus 502. For example, the communication device 504 may be a dongle connected to the information processing apparatus 502 via a USB (Universal Serial Bus) interface. The communication device 504 may be a device complying with at least one of the following standards: Bluetooth®, Basic Rate/Enhanced Data Rate (BR/EDR) standard, and Bluetooth Low Energy (BLE) standard.

The communication device 504 may be a radio frequency IDentifier (RFID) device that exchanges information by short-distance wireless communication using electromagnetic fields or electric waves. The RFID communication scheme to be used may be an electromagnetic induction scheme, an electric wave scheme, or another scheme. The communication device 504 may have an access point function.

Referring to the above description and FIG. 5, the communication device 504 is connected to the information processing apparatus 502. However, this is not exhaustive. The communication device 504 may be connected to other apparatuses constituting the radiation imaging system 500, such as the radiation generator 506. The communication device 504 may be substituted by a device incorporated in advance in the radiation imaging system 500.

A notification device 509 for notifying the operator of the radiation imaging system 500 of information is connected to the information processing apparatus 502. The notification device 509 notifies the operator of the current state of the radiation imaging apparatus 100 or the completion of a specific process based on information from the radiation imaging apparatus 100, which is received by the communication device 504 from the radiation imaging apparatus 100 via the access point 503 or the communication device 504.

The notification device 509 may be a light emitter such as a light-emitting diode (LED). In this case, the notification device 509 may perform notification to the operator by linking a plurality of lighting patterns of LEDs to the current states of the radiation imaging apparatus 100 in advance. The notification device 509 may be an acoustic device such as a speaker. In this case, the notification device 509 may perform notification to the operator by linking buzzer sound patterns to the current states of the radiation imaging apparatus 100 in advance. The notification device 509 may be a combination of a light emitter and an acoustic device. The notification device 509 may be substituted by a device such as a display or speaker provided for the information processing apparatus 502.

The synchronization controller 505 has a circuit for mediating communication and monitors the states of the radiation imaging apparatus 100 and the radiation generator 506. For example, the synchronization controller 505 controls irradiation with the radiation 507 from the radiation generator 506 and controls the imaging of the object H by the radiation imaging apparatus 100. The synchronization controller 505 may incorporate a HUB that connects a plurality of network devices. An irradiation system 501 that irradiates the radiation imaging apparatus 100 with the radiation 507 may be regarded to be constituted by the synchronization controller 505 and the radiation generator 506. In addition, the irradiation system 501 may be regarded to include other apparatuses such as the access point 503 and the information processing apparatus 502.

The radiation generator 506 includes, for example, a radiation tube that accelerates electrons at a high voltage and makes the electrons collide with the anode to generate the radiation 507. The radiation 507 is typically X-rays but may be α-rays, β-rays, γ-rays, or neutron rays.

A hospital local area network (LAN) 508 is a LAN constructed in a hospital. The radiation images captured by the radiation imaging system 500 are transmitted and received to and from various areas in the hospital via the hospital LAN 508.

In the radiation imaging system 500 shown in FIG. 5, the radiation 507 emitted by the radiation generator 506 is applied to the object H as a patient. The radiation imaging apparatus 100 generates a radiation image based on the radiation 507 transmitted through the object H.

The radiation imaging system 500 may be configured to execute both synchronous imaging and asynchronous imaging. Synchronous imaging is an imaging method of synchronizing irradiation with radiation and imaging by exchanging electrical synchronization signals between the radiation imaging apparatus 100 and the radiation generator 506 via the synchronization controller 505.

In contrast, asynchronous imaging is an imaging method in which the radiation imaging apparatus 100 starts imaging in response to the detection of the incidence of radiation without exchanging any electrical synchronization signals between the radiation imaging apparatus 100 and the radiation generator 506. In asynchronous imaging, the radiation imaging apparatus 100 may transmit a radiation image to the information processing apparatus 502 for every imaging. Instead of this operation, the radiation imaging apparatus 100 may store captured images in the radiation imaging apparatus 100 and collectively transmit a plurality of images to the information processing apparatus 502.

The radiation imaging system 500 may perform imaging under imaging conditions generally set in imaging, such as fluoroscopic imaging, continuous imaging, still imaging, DSAn imaging, roadmap imaging, program imaging, tomography, or tomosynthesis imaging.

The following settings are made in the radiation imaging system 500: an imaging frame rate, a tube voltage, a tube current, a sensor readout area, a sensor drive binning setting, a collimator diaphragm setting, a radiation window width, and setting of various functions such as saving or not saving a radiation image in the radiation imaging apparatus 100. In addition, functions such as automatic dose control (ADC) and automatic exposure control (AEC) may be set in the radiation imaging system 500.

A dose, an irradiation upper limit time (ms), a tube current (mA), a tube voltage (kV), a region of interest (ROI) as a region in which radiation should be monitored, and the like are input to the information processing apparatus 502 via an input unit provided for the information processing apparatus 502. When the exposure switch attached to the radiation generator 506 is operated, the information processing apparatus 502 transmits a start request signal to the radiation imaging apparatus 100. The start request signal may be a signal requesting the radiation imaging apparatus 100 to prepare for the reception of irradiation with radiation.

In response to the reception of the start request signal, the radiation imaging apparatus 100 starts to prepare for the reception of irradiation with radiation. Upon completing the preparation, the radiation imaging apparatus 100 transmits a start enable signal to the radiation generator 506 via the access point 503 or the communication device 504. The start enable signal may be a signal notifying that the radiation generator 506 can start irradiation with radiation. In response to the reception of the start enable signal, the radiation generator 506 starts irradiation with the radiation 507.

In response to a case where the integrated irradiation dose of radiation applied has reached a threshold, the radiation imaging apparatus 100 transmits an irradiation stop signal to the radiation generator 506 via the access point 503 or the communication device 504. The irradiation stop signal may be a signal requesting the stop of irradiation with radiation. In response to the reception of the irradiation stop signal, the radiation generator 506 stops the irradiation with the radiation 507.

For example, the control unit 180 determines a dose threshold based on the input value of a dose, a radiation irradiation intensity, the communication delays between the respective units, a processing delay, and the like. When the irradiation time of radiation reaches the input irradiation upper limit time, the radiation generator 506 may stop the irradiation with radiation even without the reception of an irradiation stop signal.

After the stop of the irradiation with radiation, the radiation imaging apparatus 100 sequentially scans the drive lines 110 (the drive lines 110 other than the detection drive line 111) to which only the imaging pixels 101 are connected and reads out image signals from the respective imaging pixels 101 via the readout circuit 160, thereby acquiring a radiation image.

The electric charge accumulated in the detection pixels 104 are read out during irradiation with radiation, and the correction pixels 107 are light-shielded. For this reason, signals from these pixels cannot be used for the formation of a radiation image. Accordingly, the signal processing unit 170 of the radiation imaging apparatus 100 may interpolate pixel values at the positions of these pixels by performing interpolation processing using the pixel values of the imaging pixels 101 around the detection pixels 104 and the correction pixels 107.

An example of the operation of the radiation imaging apparatus 100 will be described with reference to FIG. 6. This operation is executed in cooperation between the control unit 180, which controls the driving circuit 150 and the readout circuit 160, and the signal processing unit 170. This operation determines the irradiation dose of radiation applied to the radiation imaging apparatus 100. Referring to FIG. 6, "radiation" indicates whether the radiation imaging apparatus 100 is irradiated with radiation. When "radiation" is at low level, no radiation is applied. When "radiation" is at high level, radiation is applied.

"Vg1" to "Vgn" indicate drive signals supplied from the driving circuit 150 to the plurality of drive lines 110. "Vgk" corresponds to the kth (k=1, . . . , the total number of drive lines) drive line 110. As described above, some of the plurality of drive lines 110 are also referred to as the detection drive lines 111. The jth detection drive line 111 is represented by "Vdj" (j=1, . . . , the total number of detection drive lines).

φSH represents the level of a control signal supplied to the sample/hold circuit SH of the amplifying unit 161. φR represents the level of a control signal supplied to the differential amplifying circuit AMP of the amplifying unit 161. "Detection pixel signal" represents the value of a signal read out from the detection pixel 104. "Correction pixel signal" represents the value of a signal read out from the correction pixel 107. "Integrated irradiation dose" represents the integrated value of radiation applied to the radiation imaging apparatus 100. A method of determining this integrated value will be described later.

At time t0, the control unit 180 starts a reset operation for a plurality of pixels. The reset operation is an operation of removing electric charge accumulated in the conversion element of each pixel. More specifically, the reset operation is to set the switch element of each pixel in a conductive state by supplying a drive signal to the drive line 110. By controlling the driving circuit 150, the control unit 180 resets each pixel connected to the drive line 110 in the first row.

Subsequently, the control unit 180 resets each pixel connected to the drive line 110 in the second row. The control unit 180 repeats this operation up to the drive line 110 in the last row. At time t1, the control unit 180 completes the reset operation for the drive line 110 in the last row and then repeats the reset operation from the drive line 110 in the first row again.

At time t2, the control unit 180 receives a start request signal from the information processing apparatus 502. In response to the reception of the start request signal, the control unit 180 performs a reset operation up to the last row and completes the reset operation. The control unit 180 may complete the reset operation before the execution of the reset operation up to the last row and shift to next processing.

For example, upon receiving a start request signal during a reset operation for the drive line 110 in the kth row, the control unit 180 may shift to the next processing without performing a reset operation for the drive line 110 in the (k+1)th row. In this case, stepped portions that can occur in a radiation image may be reduced by performing drive adjustment for acquiring the radiation image and image processing for the radiation image.

At time t3, the control unit 180 starts a determining operation for determining the irradiation dose of radiation during irradiation of the radiation imaging apparatus 100. In the determining operation, the control unit 180 repeatedly executes a readout operation of reading out from the detection pixel 104 and the correction pixel 107. Of the readout operations performed a plurality of times, one or more readout operations in the first half are performed to determine a correction value, and the readout operation repeated in the second half is performed to continuously determine the irradiation dose of radiation at each time point.

A readout operation is executed for the detection drive line 111 but is not performed for the remaining drive lines 110. More specifically, the driving circuit 150 supplies a drive signal to the drive line 110 (that is, the detection drive line 111) of the plurality of drive lines 110 which is connected to at least one of the detection pixel 104 and the correction pixel 107.

However, the driving circuit 150 supplies no drive signal to the drive line 110 of the plurality of drive lines 110 which is connected to neither the detection pixel 104 nor the correction pixel 107. At the same time, the driving circuit 150 supplies a drive signal to the drive line 110 of the plurality of drive lines 110 which is connected to at least one of the detection pixel 104 and the correction pixel 107. With this operation, the readout circuit 160 reads out signals from a plurality of pixels connected to the same signal line 120 in a combined state. Since the detection pixel 104 and the correction pixel 107 are exclusively connected to the signal line 120, the readout circuit 160 can separately read out signals from pixels with different sensitivities.

In one readout operation, the control unit 180 performs the operation between time t3 and time t4. More specifically, the control unit 180 temporarily supplies a drive signal to one or more detection drive lines 111. Subsequently, the control unit 180 temporarily sets the control signal øSH at high level to hold, in the sample/hold circuit SH, the signal read out from the pixel by the readout circuit 160 via the signal line 120.

Subsequently, the control unit 180 temporarily sets the control signal φR at high level to reset the readout circuit 160 (more specifically, the differential amplifying circuit AMP of the amplifying unit 161 of the readout circuit 160). When a region of interest is set in the imaging region IR, any signal need not be read out from the detection pixels 104 that are not included in the region of interest.

In order to determine a correction value, the control unit 180 performs a readout operation a predetermined number of times equal to or more than one time. The signal processing unit 170 determines a correction value Od based on the signals read out from the detection pixels 104 by the predetermined number of times of readout operations and a correction value Oc based on the signals read out from the correction pixels 107 by the predetermined number of times of readout operations.

Determination on the correction value Od will be described in detail. If the predetermined number of times is one, since one signal is read out from the detection pixel 104, the signal processing unit 170 sets the value of the signal as the correction value Od. If the predetermined number of times is plural, the signal processing unit 170 sets the average value of a plurality of read signals as the correction value Od. Another statistical value may be used in place of the average value. The correction value Oc is also determined based on the signal read out from the correction pixel 107. The signal processing unit 170 stores the correction values Od and Oc determined in this manner in the storage unit 172 so as to allow the values to be used for subsequent processing.

When one or more readout operations are completed, the control unit 180 transmits a start enable signal to the radiation generator 506 at time t5. The above determination of the correction values Od and Oc may be performed before or after the transmission of the start enable signal. Upon transmitting the start enable signal, the control unit 180 repeatedly executes the above readout operation. The signal processing unit 170 measures an irradiation dose of radiation for each readout operation and determines whether the integrated value of the irradiation doses exceeds a threshold. After time t5, irradiation with radiation is started from time t6 after time t5.

When the integrated irradiation dose reaches the threshold at time t7, the control unit 180 transmits an irradiation stop signal to the synchronization controller 505. Instead of this operation, the control unit 180 may estimate the time when the integrated irradiation dose reaches the threshold and transmit an irradiation stop signal at the estimated time. At time t8, the synchronization controller 505 causes the radiation generator 506 to stop the irradiation with radiation in response to the reception of the irradiation stop signal. Subsequently, the radiation imaging system 500 executes a reset operation as in the operation from time t0 to time t3.

As described above, in the operation in FIG. 6, the radiation imaging apparatus 100 transmits an irradiation stop signal at time t7, and the synchronization controller 505 causes the radiation generator 506 to stop irradiation with radiation upon receiving the irradiation stop signal. Accordingly, if the communication delay between the radiation imaging apparatus 100 and the synchronization controller 505 increases, the object H is irradiated with radiation with a dose larger than a target dose. In addition to the communication delay between the radiation imaging apparatus 100 and the synchronization controller 505, the communication delay between the synchronization controller 505 and the radiation generator 506 and the processing delay in the synchronization controller 505 can also lead to an excessive increase in irradiation dose.

Accordingly, in some embodiments, the radiation imaging system 500 calculates the delay time that caused at the stop of irradiation with radiation. Based on the measured delay time, for example, the radiation imaging system 500 can change the threshold to be used for an irradiation stop signal, or the user of the radiation imaging system 500 can change the environment of the radiation imaging system 500. Assume that the user of the radiation imaging system 500 thinks that the delay caused at the stop of irradiation with radiation originates from communication. In this case, the user may stop another communication using the same communication device (for example, the access point 503) or restart the communication device. The user of the radiation imaging system 500 may be the operator of the radiation imaging system 500, the administrator of the radiation imaging system 500, or another user.

Figures 7, 8:
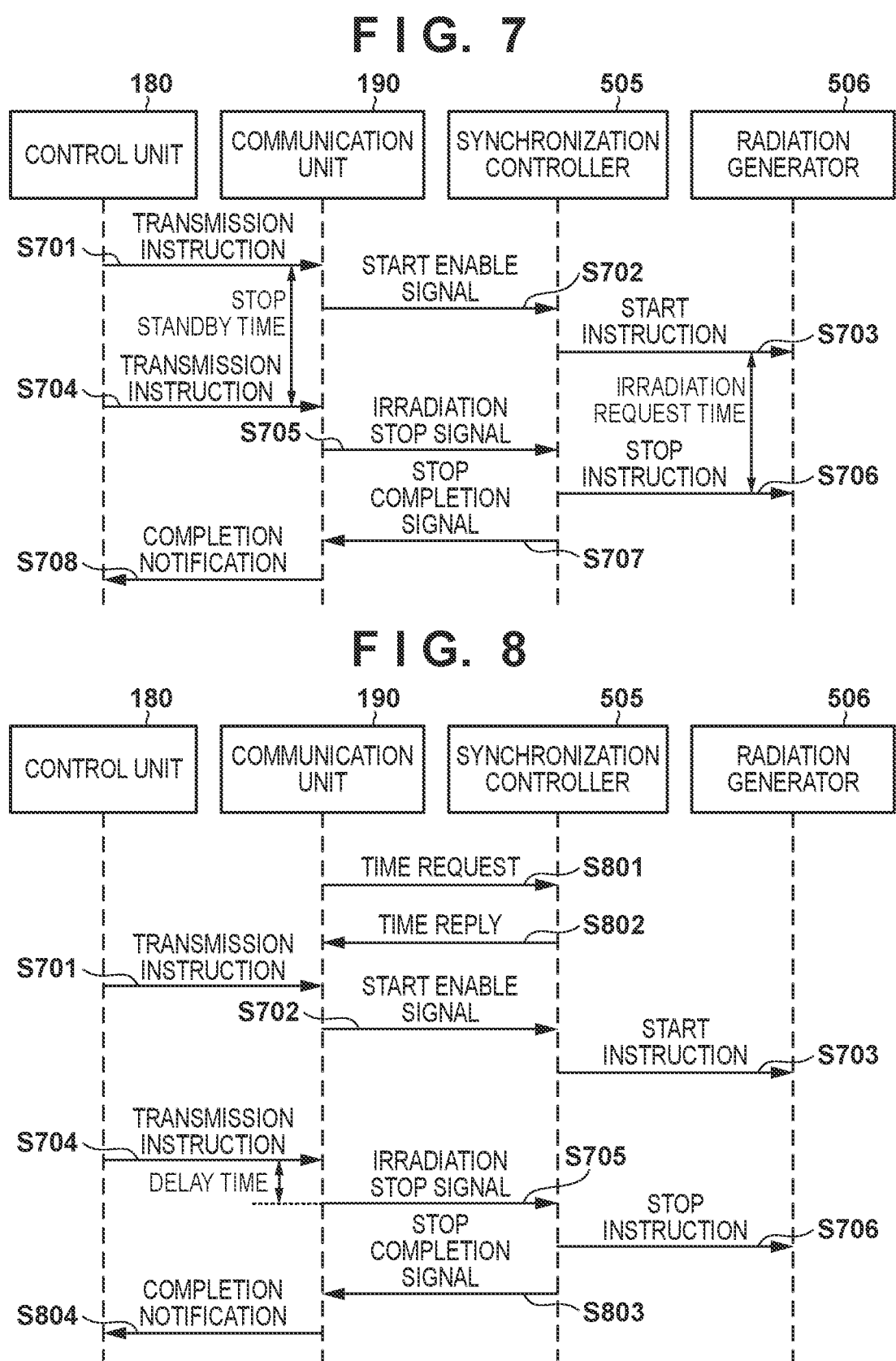
FIG. 7 is a flowchart for explaining an operation example of calculating the delay time according to some embodiments.
FIG. 8 is a flowchart for explaining another operation example of calculating the delay time according to some embodiments.
Figure 9:
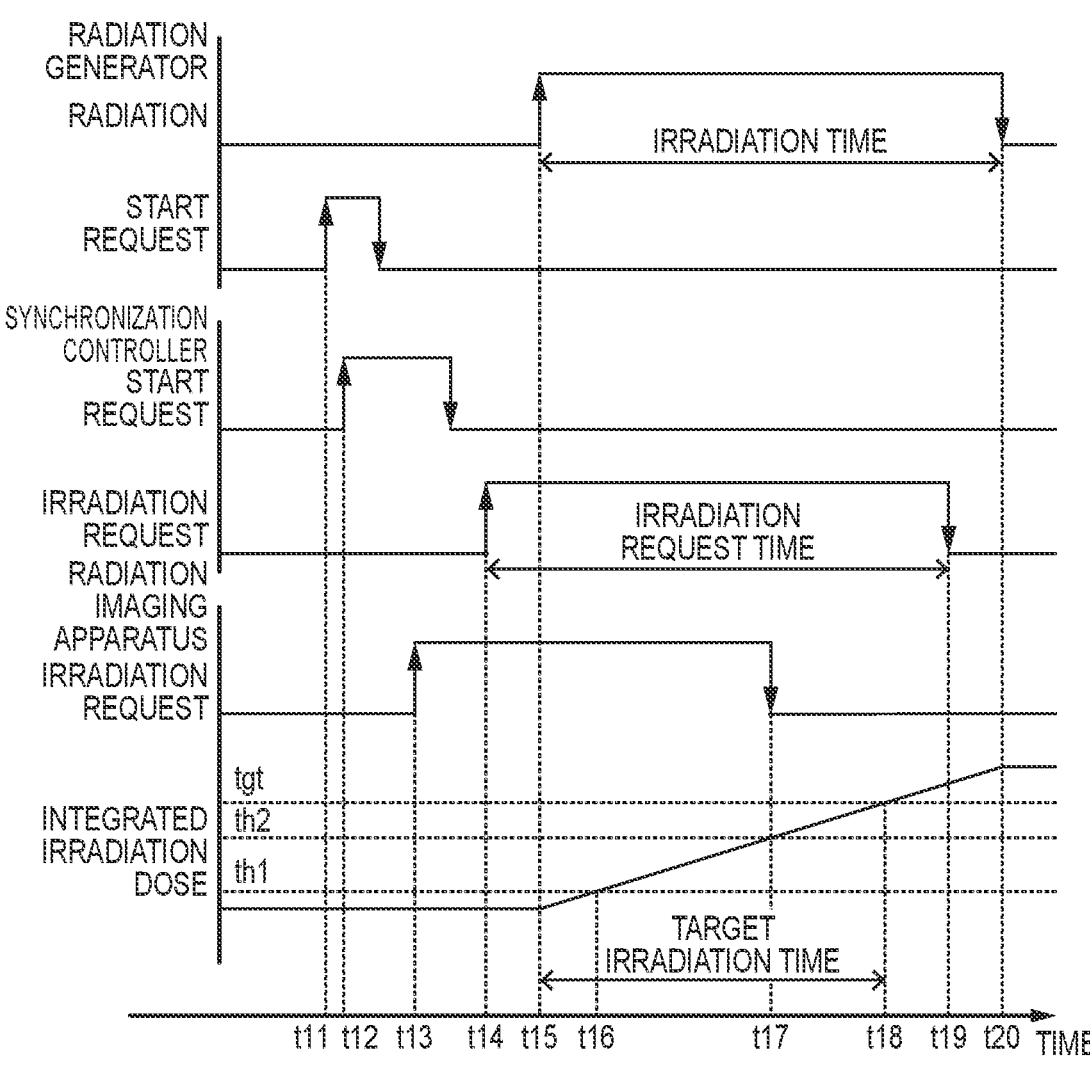
FIG. 9 is a timing chart for explaining another operation example of calculating the delay time according to some embodiments.

Examples of the method of calculating the delay time caused at the stop of irradiation with radiation will be described with reference to FIGS. 7 to 9. FIGS. 7 to 9 respectively explain different methods of measuring delay times. The radiation imaging system 500 may use any of the methods to measure the delay time. Each process in these methods may be performed by the processor of each apparatus executing a program stored in the memory of each apparatus. Some or all processes in these methods may be executed by an application specific integrated circuit (ASIC) or a dedicated integrated circuit such as a field programmable gate array. The same applies to the method in FIG. 10.

An example of the method of calculating the delay time caused at the stop of irradiation with radiation will be described with reference to FIG. 7. Focusing on the operation to be performed to measure the delay time, FIG. 7 omits other operations performed by the radiation imaging system 500.

In step S701, the control unit 180 instructs the communication unit 190 to transmit a start enable signal. As described above, the start enable signal may be a signal notifying that the radiation generator 506 can start irradiation with radiation. The control unit 180 specifies the time when it has instructed the communication unit 190 to transmit the start enable signal and stores the time in the memory. The time stored in the memory can also be called a time stamp. In the following description, other times can also be called time stamps. This time may be the time measured by the built-in timepiece in the radiation imaging apparatus 100. The time when the control unit 180 has instructed the communication unit 190 to transmit the start enable signal may be the time immediately after the instruction or the time immediately before the instruction. Similarly, as another time in the following description, the time immediately before a specific operation may be stored, or the time immediately after the specific operation may be stored.

In step S702, the communication unit 190 transmits a start enable signal to the synchronization controller 505 in response to the reception of an instruction from the control unit 180. This transmission may be performed by wireless communication.

The time (that is, the time in S701) when the control unit 180 has instructed the communication unit 190 to transmit the start enable signal may be regarded as the time when the radiation imaging apparatus 100 transmits the start enable signal to the synchronization controller 505. Instead, the time when the radiation imaging apparatus 100 transmits the start enable signal to the synchronization controller 505 may be the time (that is, the time in step S702) when the communication unit 190 has transmits the start enable signal.

In step S703, the synchronization controller 505 instructs the radiation generator 506 to start irradiation with radiation in response to the reception of the start enable signal. This instruction may be issued by transmitting a signal to the radiation generator 506. The synchronization controller 505 specifies the time when the synchronization controller 505 has instructed the radiation generator 506 to start irradiation with radiation and stores the time in the memory. This time may be the time measured by the built-in timepiece in the synchronization controller 505. The radiation generator 506 starts irradiation with radiation in accordance with the instruction.

In step S704, the control unit 180 instructs the communication unit 190 to transmit an irradiation stop signal. As described above, the irradiation stop signal may be a signal requesting the stop of irradiation with radiation by the radiation generator 506. The control unit 180 specifies the time when the control unit 180 has instructed the communication unit 190 to transmit the irradiation stop signal and stores the time in the memory. This time may be the time measured by the built-in timepiece in the radiation imaging apparatus 100.

In step S705, the communication unit 190 transmits the irradiation stop signal to the synchronization controller 505 in response to the reception of the instruction from the control unit 180. This transmission may be performed by wireless communication.

The time (that is, the time in step S704) when the control unit 180 has instructed the communication unit 190 to transmit the irradiation stop signal may be regarded as the time when the radiation imaging apparatus 100 transmits the irradiation stop signal to the synchronization controller 505. Instead, the time when the radiation imaging apparatus 100 transmits the irradiation stop signal to the synchronization controller 505 may be the time (that is, the time in step S705) when the communication unit 190 transmits the irradiation stop signal. The time when the radiation imaging apparatus 100 transmits the irradiation stop signal to the synchronization controller 505 is an example of the time specified by the radiation imaging apparatus 100 with respect to the stop of irradiation with radiation.

In step S706, the synchronization controller 505 instructs the radiation generator 506 to stop the irradiation with radiation in response to the reception of the irradiation stop signal. This instruction may be issued by transmitting a signal to the radiation generator 506. The synchronization controller 505 specifies the time when the synchronization controller 505 has instructed the radiation generator 506 to start irradiation with radiation and stores the time in the memory. This time may be the time measured by the built-in timepiece in the synchronization controller 505. The radiation generator 506 stops the irradiation with radiation in accordance with this instruction.

The time when the synchronization controller 505 has instructed the radiation generator 506 to start irradiation with radiation is an example of the time specified by the irradiation system 501 with respect to the stop of irradiation with radiation. The time specified by the irradiation system 501 with respect to the stop of the irradiation with radiation may be the time when the synchronization controller 505 receives the irradiation stop signal in S705 or the time when the radiation generator 506 has stopped the irradiation with radiation.

In step S707, the synchronization controller 505 transmits a stop completion signal to the radiation imaging apparatus 100 in accordance with the instruction to start irradiation with radiation to the radiation generator 506. The stop completion signal may be a signal notifying the completion of the stop of the irradiation with radiation.

The synchronization controller 505 calculates the time interval from the time stored in the memory in step S703 to the time stored in the memory in step S706. The synchronization controller 505 transmits information indicating this time interval to the radiation imaging apparatus 100 together with the stop completion signal or separately from the stop completion signal. This time interval is the time interval from the time when the synchronization controller 505 transmits the signal requesting the start of irradiation with radiation to the radiation generator 506 to the time when the synchronization controller 505 transmits the signal requesting the stop of the irradiation with radiation to the radiation generator 506. This time interval will be expressed as the irradiation request time hereinafter.

In step S708, the communication unit 190 notifies control unit 180 of the completion of the stop of the irradiation with radiation. This notification may include information indicating the irradiation request time received from the synchronization controller 505.

The control unit 180 calculates the time interval from the time stored in the memory in step S701 to the time stored in the memory in step S704. This time interval is the time interval from the time when the radiation imaging apparatus 100 transmits the start enable signal to the synchronization controller 505 to the time when the radiation imaging apparatus 100 transmits the irradiation stop signal to the synchronization controller 505. This time interval will be expressed as the stop standby time hereinafter.

The control unit 180 calculates the delay time caused at the stop of the irradiation with radiation based on the difference between the above irradiation request time and the above stop standby time. For example, the control unit 180 may set, as the delay time, the value obtained by subtracting the stop standby time from the irradiation request time. If the time required for communication between the radiation imaging apparatus 100 and the synchronization controller 505 and the processing time in each apparatus are invariable regardless of the time, the time interval from the time in step S701 to the time in step S703 coincides with the time interval from the time in step S704 to the time in step S706. Accordingly, since the irradiation request time is equal in value to the stop standby time, the delay time becomes zero. In contrast, if, for example, the delay at the transmission of an irradiation stop signal increases, although the stop standby time is invariable, the irradiation request time increases. For this reason, the delay time calculated based on the difference between the irradiation request time and the stop standby time increases. As a result, the stop of the irradiation with radiation by the radiation generator 506 delays, and the object H is irradiated with radiation larger than the target dose.

In the method in FIG. 7, the irradiation request time is calculated by using the time in step S703 and the time in step S706 each calculated by the built-in timepiece in the synchronization controller 505. In addition, the stop standby time is calculated by using the time in step S701 and the time in step S704 each calculated by the built-in timepiece in the radiation imaging apparatus 100. Accordingly, even if the built-in timepiece in the synchronization controller 505 is not synchronized with the built-in timepiece in the radiation imaging apparatus 100, no influence is exerted on the calculation of the delay time.

In the method in FIG. 7, the control unit 180 calculates the delay time caused at the stop of the irradiation with radiation based on the difference between the irradiation request time and the stop standby time. The irradiation request time is based on the time in step S706, and the stop standby time is based on the time in step S704. That is, the control unit 180 calculates the delay time caused at the stop of the irradiation with radiation based on the time in step S704 and the time in step S706. As described above, the time in step S704 is the time (more specifically, the time when the irradiation stop signal is transmitted) specified by the radiation imaging apparatus 100 with respect to the stop of the irradiation with radiation. The time in step S706 is the time specified by the irradiation system 501 with respect to the stop of the irradiation with radiation (more specifically, the time when an instruction to stop the irradiation with radiation is issued).

In the method in FIG. 7, the control unit 180 calculates the delay time caused at the stop of the irradiation with radiation based on the difference between the irradiation request time and the stop standby time. As described above, the irradiation request time is the time interval from the time when the synchronization controller 505 transmits a signal requesting the start of irradiation with radiation to the radiation generator 506 to the time when the synchronization controller 505 transmits a signal requesting the stop of the irradiation with radiation to the radiation generator 506. The control unit 180 may use the time calculated based on another time specified by the irradiation system 501 with respect to the stop of the irradiation with radiation instead of the irradiation request time. For example, the control unit 180 may use, instead of the irradiation request time, the time interval from the time when the synchronization controller 505 receives a signal requesting the start of irradiation with radiation to the time when the synchronization controller 505 receives a signal requesting the stop of the irradiation with radiation. Alternatively, the control unit 180 may use, instead of the irradiation request time, the time interval from the time when the radiation generator 506 starts irradiation with radiation to the time when the radiation generator 506 stops the irradiation with radiation.

In the method in FIG. 7, the synchronization controller 505 calculates the irradiation request time and transmits the irradiation request time to the radiation imaging apparatus 100. Instead of this time, the synchronization controller 505 may transmit the time in step S703 and the time in step S706. The control unit 180 calculates the irradiation request time based on the received times in steps S703 and S706.

In the method in FIG. 7, the control unit 180 calculates the delay time caused at the stop of the irradiation with radiation. Instead of this operation, an apparatus other than the radiation imaging system 500, for example, the synchronization controller 505 or the information processing apparatus 502 may calculate the delay time. The apparatus that calculates the delay time acquires information (for example, the irradiation request time and the stop standby time) used for the calculation of the delay time from itself or another apparatus.

Another example of the method of calculating the delay time caused at the stop of the irradiation with radiation will be described with reference to FIG. 8. Focusing on the operation to be performed to measure the delay time, FIG. 8 omits other operations performed by the radiation imaging system 500.

In step S801, the communication unit 190 requests the time of the built-in timepiece in the synchronization controller 505 by using a protocol for time synchronization, such as Network Time Protocol (NTP).

In step S802, the synchronization controller 505 replies with the time of the built-in timepiece of the apparatus. The control unit 180 synchronizes the built-in timepiece in the radiation imaging apparatus 100 with the built-in timepiece in the irradiation system 501 (the built-in timepiece in the synchronization controller 505 in this case) by using the time acquired from the synchronization controller 505. In the operation described later, if the time of the radiation generator 506 is used for the calculation of the delay time, the built-in timepiece in the radiation imaging apparatus 100 may be synchronized with the built-in timepiece in the radiation generator 506.

Synchronization between the built-in timepieces may be performed at any time. For example, synchronization may be performed as part of the activation processing of the radiation imaging apparatus 100. Instead of this operation, synchronization may be performed as part of the reset operation described with reference to FIG. 6. In the example in FIG. 8, although the radiation imaging apparatus 100 adjusts the time of the built-in timepiece by itself, the synchronization controller 505 or the radiation generator 506 may adjust the time of the built-in timepiece of itself. Time synchronization may be performed in a communication form with little variation in communication time, such as wired communication.

Subsequently, an operation similar to that in steps S701 to S706 in FIG. 7 is performed. Note, however, that in step S701, the control unit 180 need not store, in the memory, the time when the control unit 180 has instructed the communication unit 190 to transmit a start enable signal. In step S703, the synchronization controller 505 need not store, in the memory, the time when the synchronization controller 505 has instructed the radiation generator 506 to start irradiation with radiation.

In step S803, the synchronization controller 505 transmits a stop completion signal to the radiation imaging apparatus 100 in accordance with the instruction issued to the radiation generator 506 to start irradiation with radiation. The stop completion signal may be a signal notifying the completion of the stop of the irradiation with radiation.

The synchronization controller 505 transmits the information indicating the time stored in the memory in step S706 to the radiation imaging apparatus 100 together with the stop completion signal or separately from the stop completion signal. This time is the time when the synchronization controller 505 transmits a signal requesting the stop of the irradiation with radiation to the radiation generator 506.

In step S804, the communication unit 190 notifies the control unit 180 of the completion of the stop of the irradiation with radiation. This notification may include the information indicating the time received from the synchronization controller 505.

The control unit 180 calculates the delay time caused at the stop of the irradiation with radiation based on the difference between the time stored in the memory in step S701 and the time acquired in step S804. For example, the control unit 180 may set the difference between the time stored in the memory in step S701 and the time acquired in step S804 as the delay time. Instead of this delay time, the control unit 180 may set, as the delay time, the value obtained by subtracting the time assumed to be required for normal communication from this difference.

In the method in FIG. 8, the control unit 180 calculates the delay time caused at the stop of the irradiation with radiation based on the difference between the time in step S704 and the time in step S706. As described above, the time in step S704 is the time when the radiation imaging apparatus 100 transmits an irradiation stop signal to the synchronization controller 505 and is measured by the built-in timepiece in the radiation imaging apparatus 100. The time in step S706 is the time when the synchronization controller 505 transmits a signal requesting the stop of the irradiation with radiation to the radiation generator 506 and is measured by the built-in timepiece in the synchronization controller 505. Since these built-in timepieces are synchronized with each other in step S802, the time in step S704 can be compared with the time in step S706.

In the method in FIG. 8, the control unit 180 calculates the delay time caused at the stop of the irradiation with radiation based on the difference between the time in step S704 and the time in step S706. The control unit 180 may calculate the delay time based on another time specified by the irradiation system 501 with respect to the stop of the irradiation with radiation instead of the time in step S706. For example, the control unit 180 may use the time when the synchronization controller 505 receives an irradiation stop signal instead of the time when the synchronization controller 505 transmits a signal requesting the stop of the irradiation with radiation to the radiation generator 506. The control unit 180 may use the time when the radiation generator 506 has stopped the irradiation with radiation instead of the time when the synchronization controller 505 transmits a signal requesting the stop of the irradiation with radiation to the radiation generator 506.

According to another embodiment, the delay time may be the time interval from the time when the control unit 180 issues an irradiation stop request to the communication unit 190 in step S704 to the time when the control unit 180 receives a completion notification via the communication unit 190 in step S804.

In the method in FIG. 8, the control unit 180 calculates the delay time caused at the stop of the irradiation with radiation. Instead of this operation, an apparatus other than the radiation imaging system 500, for example, the synchronization controller 505 or the information processing apparatus 502 may calculate the delay time. The apparatus that calculates the delay time acquires information (for example, the time in step S704 and the time in step S706) used for the calculation of the delay time from itself or another apparatus.

Another example of the method of calculating the delay time caused at the stop of the irradiation with radiation will be described with reference to FIG. 9. Focusing on the operation to be performed to measure the delay time, FIG. 9 omits other operations performed by the radiation imaging system 500.

At time t11, the radiation generator 506 requests the synchronization controller 505 to transmit a start request signal to the radiation imaging apparatus 100. At time t12, the synchronization controller 505 transmits the start request signal to the radiation imaging apparatus 100 in accordance with this request. The operation at time t12 corresponds to the operation at time t5 in FIG. 6.

As described with reference to FIG. 6, the radiation generator 506 ends the reset operation during execution and starts to accumulate electric charge in accordance with radiation in response to the reception of the start request signal. Subsequently, at time t13, the radiation generator 506 transmits a start enable signal to the synchronization controller 505. The operation at time t13 corresponds to the operation at time t5 in FIG. 6.

At time t14, the synchronization controller 505 instructs the radiation generator 506 to start irradiation with radiation in response to the reception of the start enable signal. The synchronization controller 505 stores, in the memory, the time when the radiation generator 506 has issued an instruction to start irradiation with radiation. This time may be the time measured by the built-in timepiece in the synchronization controller 505. At time t15, the radiation generator 506 start irradiation with radiation. The operation at time t15 corresponds to the operation at time t6 in FIG. 6. Time t15 may be calculated from time t14 and the rise time until the radiation generator 506 emits radiation to a predetermined dose. The rise time may be set in advance.

At time t16, the radiation imaging apparatus 100 detects that the integrated irradiation dose of radiation has reached an irradiation start threshold th1. The irradiation start threshold th1 may be determined based on the ratio of a dose target value tgt set in advance by the information processing apparatus 502. The radiation imaging apparatus 100 stores, in the memory, the time (that is, time t16) when the integrated irradiation dose of radiation has reached the irradiation start threshold th1. This time may be the time measured by the built-in timepiece in the radiation imaging apparatus 100.

At time t17, the radiation imaging apparatus 100 detects that the integrated irradiation dose of radiation has reached an irradiation stop threshold th2. The irradiation stop threshold th2 is determined such that the integrated irradiation dose of radiation at the time of the stop of the irradiation with radiation coincides with the dose target value tgt. For example, the radiation imaging apparatus 100 may determine the irradiation stop threshold th2 based on the predictive time from the time when the radiation imaging apparatus 100 transmits an irradiation stop signal to the time when the radiation generator 506 stops the irradiation with radiation. Alternatively, the radiation imaging apparatus 100 may determine the irradiation stop threshold th2 based on the increasing rate of the integrated irradiation dose of radiation due to radiation during incidence of radiation. In another embodiment, the radiation imaging apparatus 100 may determine the irradiation stop threshold th2 by subtracting the communication delay amount among the radiation generator 506, the synchronization controller 505, and the radiation imaging apparatus 100 from the dose target value tgt. This communication delay amount may be stored in the radiation imaging apparatus 100 in advance. The radiation imaging apparatus 100 transmits an irradiation stop signal to the synchronization controller 505 in accordance with a case where the integrated irradiation dose of radiation has reached the irradiation stop threshold th2.

At time t18, the radiation imaging apparatus 100 detects that the integrated irradiation dose of radiation has reached the dose target value tgt. The radiation imaging apparatus 100 specifies the time (that is, time t18) when the integrated irradiation dose of radiation has reached the dose target value tgt and stores the time in the memory. This time may be the time measured by the built-in timepiece in the radiation imaging apparatus 100. The time is an example of the time specified by the radiation imaging apparatus 100 with respect to the stop of the irradiation with radiation. In the example in FIG. 9, assume that a large communication delay has occurred at the time of the transmission of an irradiation stop signal. For this reason, even after the integrated irradiation dose of radiation has reached the dose target value tgt at time t18, the irradiation with radiation continues.

At time t19, the synchronization controller 505 instructs the radiation generator 506 to stop the irradiation with radiation in response to the reception of the irradiation stop signal. The synchronization controller 505 stores, in the memory, the time when the synchronization controller 505 has instructed the radiation generator 506 to stop the irradiation with radiation. This time may be the time measured by the built-in timepiece in the synchronization controller 505. The operation at time t19 corresponds to the operation at time t7 in FIG. 6. At time t20, the radiation generator 506 stops the irradiation with radiation. The operation at time t20 corresponds to the operation at time t8 in FIG. 6.

Subsequently, the synchronization controller 505 transmits an irradiation request time to the radiation imaging apparatus 100 as in the method in FIG. 7. Assuming that an increase in the integrated irradiation dose of radiation is linear, the radiation imaging apparatus 100 estimates time t15 when the irradiation with radiation has started. For example, the radiation imaging apparatus 100 may estimate time t15 based on the gradient of the integrated irradiation dose of radiation from time t16 to time t18 and the integrated irradiation dose of radiation immediately after the end of the reset operation. Subsequently, the radiation imaging apparatus 100 determines the time interval from time t15 to time t18 as the time interval from the time when irradiation with radiation starts to the time when the integrated irradiation dose of radiation reaches the dose target value tgt. This time interval is represented as a target irradiation time. If an increase in the integrated irradiation dose of radiation is not linear, the radiation imaging apparatus 100 may calculate time t15 by using a statistical method such as linear interpolation.

Subsequently, the radiation imaging apparatus 100 calculates the delay time caused at the stop of the irradiation with radiation by using a target irradiation time instead of the stop standby time in the method in FIG. 7. Various modifications described with reference to the method in FIG. 7 can be equally applied to the method in FIG. 9. In addition, in the method in FIG. 9, the radiation imaging system 500 may synchronize the built-in timepieces with each other as in the method in FIG. 8 and calculate the difference between time t18 and time t20 as the delay time. As described above, time t18 is the time when the integrated irradiation dose of radiation has reached the dose target value tgt. Time t20 is the time when the radiation generator 506 has stopped radiation. Time t20 may be calculated from time t19 and the fall time until the radiation generator 506 emits radiation to a predetermined dose. The fall time may be set in advance.

An example of a method of notifying the user of the delay caused at the stop of the irradiation with radiation will be described with reference to FIG. 10. In the following description, the radiation imaging apparatus 100 (more specifically, the control unit 180) executes each process in the method in FIG. 10. An apparatus other than the radiation imaging system 500, for example, the synchronization controller 505 or the information processing apparatus 502 may execute some or all processes in the method in FIG. 10. The method in FIG. 10 may be started in accordance with the user of the radiation imaging system 500 issuing an instruction to start imaging. In step S1001, the radiation imaging system 500 images the object H by executing the operation described with reference to FIG. 6, thereby generating a radiation image. In step S1002, the control unit 180 calculates the delay time caused at the stop of the irradiation with radiation. The calculation of the delay time may be performed by using any of the methods described with reference to FIGS. 7 to 9.

In step S1003, the control unit 180 determines whether the delay time calculated in step S1002 exceeds the notification threshold. Upon determining that the delay time exceeds the notification threshold ("YES" in step S1003), the control unit 180 shifts the process to step S1004; otherwise ("NO" in step S1003), the control unit 180 terminates the processing.

In a case where the radiation imaging system 500 is in a normal operation state, the delay time calculated by the method in FIG. 7 or the method in FIG. 9 is expected to be zero. Accordingly, a notification threshold may be set to the time that allows irradiation with radiation exceeding a target dose. The time that allows irradiation with radiation exceeding the target dose is represented by the allowable time.

In a case where the radiation imaging system 500 is in a normal operation state, the delay time calculated by the method in FIG. 8 needs to be a certain amount of time. Accordingly, a notification threshold may be set to the value obtained by adding the above allowable time to the time as a premise for the notification threshold. The time as a premise may also be a representative value (for example, a mode value or average value).

The allowable time may be based on the upper limit value of the accumulation time of electric charge by the radiation imaging apparatus 100. For example, the allowable time may be a value between 10% and 30% of the upper limit value of the accumulation time of electric charge by the radiation imaging apparatus 100, for example, 20%. The upper limit value of the accumulation time of electric charge may be the time interval from the time when the radiation imaging apparatus 100 starts to accumulate electric charge in the imaging pixel 101 to the time when the radiation imaging apparatus 100 starts to read out electric charge from the imaging pixel 101.

The information processing apparatus 502 may set a notification threshold in the radiation imaging apparatus 100. For example, the information processing apparatus 502 may transmit the notification threshold to the radiation imaging apparatus 100 before the execution of step S1001. Instead of this operation, a notification threshold may be stored in the storage unit 172 of the radiation imaging apparatus 100 in advance.

The allowable time may be based on the time interval (the target irradiation time in FIG. 9) from the time when irradiation with radiation is started to the time when the irradiation dose of radiation reaches the dose target value tgt. For example, the allowable time may be a value between 10% and 30% of the target irradiation time, for example, 20%. When the target irradiation time is short, as compared with a case where the target irradiation time is long, the irradiation dose of radiation excessively applied due to the delay time amount becomes dominant, which tends to influence the image quality. Accordingly, the influence on the image quality can be reduced by determining an allowable time based on the target irradiation time.

In step S1004, the control unit 180 notifies the user of the radiation imaging system 500 that the delay time has exceeded the notification threshold. The user of the radiation imaging system 500 may be an operator (for example, a doctor or technician) of the radiation imaging system 500 or the administrator of the radiation imaging system 500. For example, the control unit 180 notifies the information processing apparatus 502 via the communication unit 190 that the delay time has exceeded the notification threshold. The information processing apparatus 502 notifies the user that the delay time has exceeded the notification threshold. The information processing apparatus 502 may present the delay time to the user. The notification device 509, the user interface of the radiation imaging apparatus 100, or the like may be used to notify the user.

The control unit 180 may notify the user before the start of the next imaging that the delay time has exceeded the notification threshold. This allows the user to recognize the occurrence of a delay at the stop of the irradiation with radiation, and hence makes it possible to inspect the environment of the radiation imaging system 500 before the next imaging. Accordingly, if a deterioration in the communication performance of the access point 503 can be specified, the user can change the settings of the access point 503 or lower the irradiation start threshold th1.

As has been described above, the radiation imaging apparatus 100 and the synchronization controller 505 may perform wireless communication. In this case, the control unit 180 may notify, based on the quality of wireless communication, that the delay time has exceeded the notification threshold. The quality of wireless communication may be determined based on, for example, a data rate, a packet loss amount per unit time, the occupancy of a packet buffer, a Received Signal Strength Indicator (RSSI) in wireless communication, an S/N ratio (SNR: Signal to Noise Ratio), or a carrier sense event. If the quality of wireless communication falls below a predetermined threshold quality, the control unit 180 may notify the user of the corresponding information. This makes it easy for the user to determine whether the delay at the stop of the irradiation with radiation has been caused by a communication delay.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-023638, filed Feb. 17, 2023, which is hereby incorporated by reference herein in its entirety.

What is claimed is:

1. A radiation imaging system, comprising:
an irradiation system including a controller configured to control a generator to emit radiation;
a radiation imaging apparatus configured to detect the radiation and request the irradiation system to stop the irradiation with the radiation based on an irradiation dose of the radiation;
a processor; and
a memory storing a program which, when executed by the processor, causes the radiation imaging apparatus or the irradiation system to:
calculate a delay time caused at a stop of irradiation with the radiation based on first time information specified by the radiation imaging apparatus with respect to the stop of the irradiation with the radiation and second time information specified by the irradiation system with respect to the stop of the irradiation with the radiation.

2. The radiation imaging system according to claim 1, wherein the first time information is a time when the irradiation dose of the radiation has reached a target value or a time when the radiation imaging apparatus transmits a first signal requesting the stop of the irradiation with the radiation to the controller, and
the second time information is a time when the controller receives the first signal, a time when the controller transmits a second signal requesting the stop of the irradiation with the radiation to the generator, or a time when the generator has stopped the irradiation with the radiation.

3. The radiation imaging system according to claim 2, wherein the program, when executed by the processor, further causes the radiation imaging apparatus or the irradiation system to:
synchronize a built-in timepiece in the radiation imaging apparatus with a built-in timepiece in the irradiation system; and
calculate the delay time based on a difference between the first time information and the second time information.

4. The radiation imaging system according to claim 2, wherein the program, when executed by the processor, further causes the radiation imaging apparatus or the irradiation system to: calculate the delay time based on a difference between a first time interval from a time when the radiation imaging apparatus transmits a third signal notifying that irradiation with the radiation is allowed to be started to the controller to a time when the radiation imaging apparatus transmits the first signal and a second time interval from a time when the controller receives the third signal to a time when the controller receives the first signal, a third time interval from a time when the controller transmits a fourth signal requesting a start of irradiation with the radiation to the generator to a time when the controller transmits the second signal, or a fourth time interval from a time when the generator starts irradiation with the radiation to a time when the generator stops the irradiation with the radiation.

5. The radiation imaging system according to claim 2, wherein the radiation imaging apparatus determines a fifth time interval from a time when irradiation with the radiation is started to a time when the irradiation dose of the radiation reaches the target value, and
wherein the program, when executed by the processor, further causes the radiation imaging apparatus or the irradiation system to:
calculate the delay time based on a difference between the fifth time interval and a second time interval from a time when the controller receives a third signal notifying that irradiation with the radiation is allowed to be started to a time when the controller receives the first signal, a third time interval from a time when the controller transmits a fourth signal requesting a start of irradiation with the radiation to the generator to a time when the controller transmits the second signal, or a fourth time from a time when the generator has started irradiation with the radiation to a time when the generator stops the irradiation with the radiation.

6. The radiation imaging system according to claim 1, wherein the program, when executed by the processor, further causes the radiation imaging apparatus or the irradiation system to:
notify a user of the radiation imaging system that the delay time has exceeded a threshold.

7. The radiation imaging system according to claim 6, wherein the radiation imaging apparatus and the controller perform wireless communication, and
wherein the program, when executed by the processor, further causes the radiation imaging apparatus or the irradiation system to: notify, based on quality of the wireless communication, that the delay time has exceeded the threshold.

8. The radiation imaging system according to claim 6, wherein the threshold is based on a time interval from a time when irradiation with the radiation is started to a time when an irradiation dose of the radiation reaches a target value.

9. The radiation imaging system according to claim 6, wherein the threshold is based on an upper limit value of an accumulation time of electric charge by the radiation imaging apparatus.

10. The radiation imaging system according to claim 1, wherein the calculation is performed in the radiation imaging apparatus.

\* \* \* \* \*